United States Patent [19]
Begley et al.

[11] 3,973,134
[45] Aug. 3, 1976

[54] GENERATION OF COHERENT ROTATIONAL ANTI-STOKES SPECTRA

[75] Inventors: Richard F. Begley, Boonton; Joseph J. Barrett, Morris Plains, both of N.J.

[73] Assignee: Allied Chemical Corporation, N.J.

[22] Filed: Feb. 18, 1975

[21] Appl. No.: 550,801

[52] U.S. Cl. .............................. 250/574; 250/226; 250/578; 356/75
[51] Int. Cl.² ....................... G01J 3/10; G01J 3/28; G01N 21/22
[58] Field of Search ........... 250/573, 574, 226, 578; 356/75

[56] References Cited
UNITED STATES PATENTS
3,802,777   4/1974   Regnier et al. ...................... 356/74

OTHER PUBLICATIONS
Wynne, *Nonlinear Optical Spectrometer*, IBM Technical Disclosure Bulletin, vol. 15, No. 5, Oct. 1972, pp. 1469–1470.

*Primary Examiner*—Eugene La Roche
*Attorney, Agent, or Firm*—Ernest D. Buff; Arthur J. Plantamura

[57] ABSTRACT

A method and apparatus for spectroscopic gas analysis are provided. Two coherent beams of monochromatic radiation are directed through gaseous material. A tuning mechanism adjusts the frequency difference between the radiation beams to equal substantially the rotational frequency of a preselected constituent of the gaseous material. Radiation scattered by the gaseous material is received by a filtering mechanism adapted to transmit selectively an anti-Stokes signal generated coherently during scattering. The signal is received by a detecting mechanism which indicates the intensity thereof.

11 Claims, 2 Drawing Figures

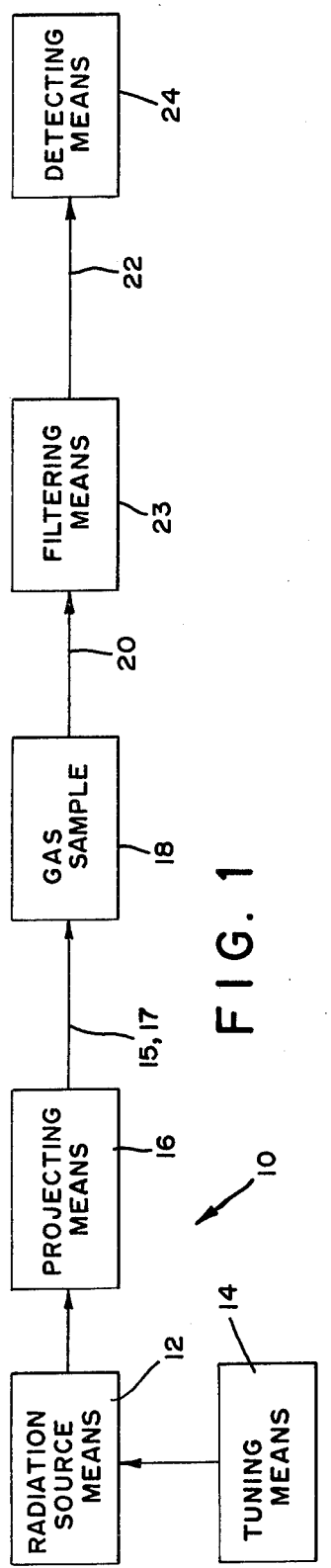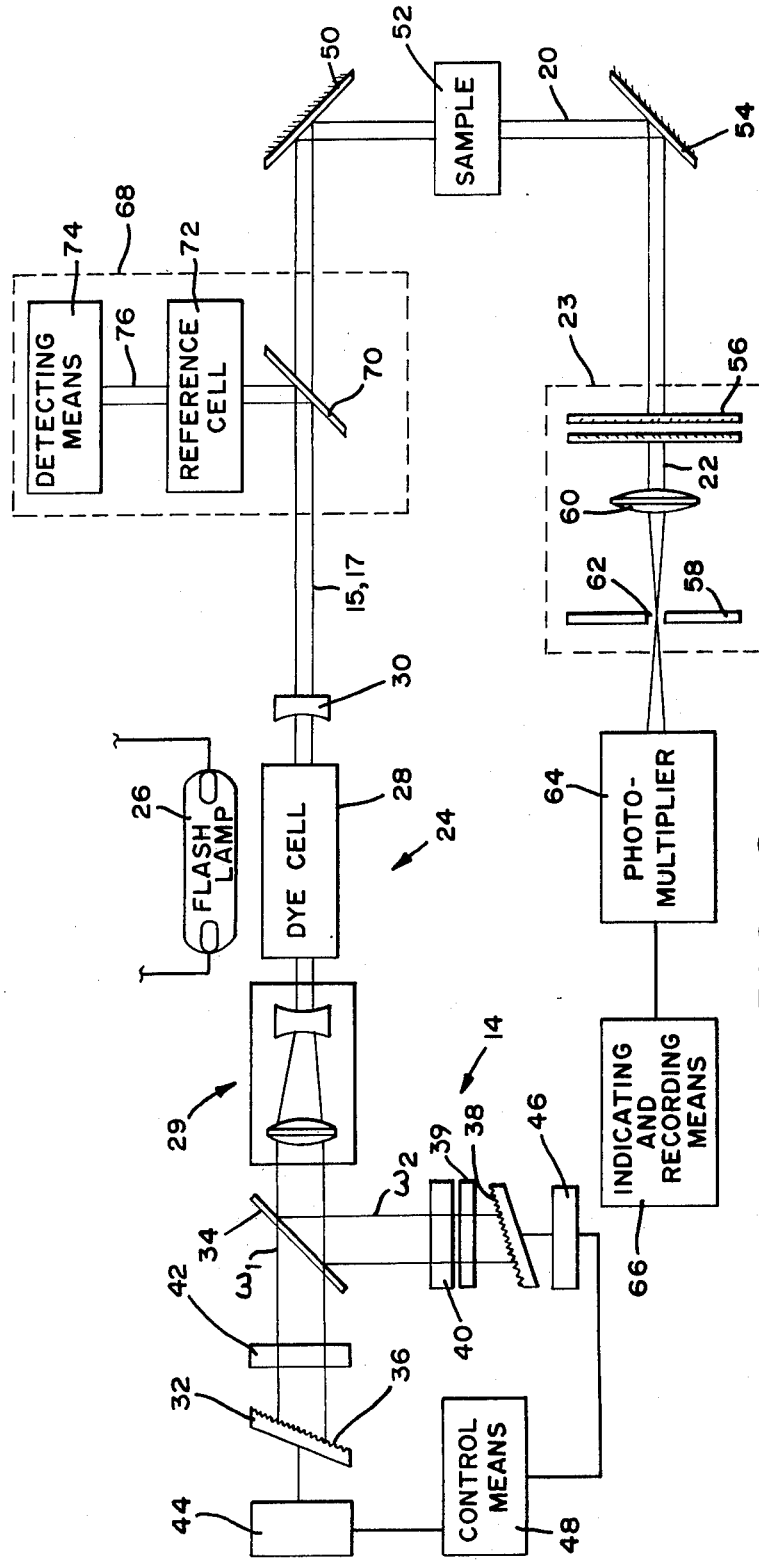

GENERATION OF COHERENT ROTATIONAL ANTI-STOKES SPECTRA

BACKGROUND OF THE INVENTION

This invention relates to the field of spectroscopy and more particularly to a method and apparatus in which two coherent beams of monochromatic light are transmitted through a gas sample at a frequency differential correlated with the rotational frequency of a gaseous constituent to detect and quantitatively measure the constituent.

DESCRIPTION OF THE PRIOR ART

In the apparatus used for spectroscopic gas analysis, scattered light produced by exciting quanta at a frequency differential close to the vibrational frequency of the gas is directed through a filtering mechanism adapted to selectively transmit an anti-Stokes component generated coherently during scattering. The output of the filtering mechanism is converted to a detectable signal and displayed.

One of the major problems with such apparatus is the difficulty of analyzing minute quantities of gaseous constituents. The output signal from the filtering mechanism is frequently altered or obscured by background interference resulting from the non-resident susceptibility of gases coexistent with the gas being analyzed. The problem is particularly troublesome when the gas being analyzed is located at a point distant from the apparatus. To alleviate such problems, it has been necessary to provide the apparatus with highly sensitive forms and combinations of detectors, sources, filters, control systems and the like, which are relatively expensive.

SUMMARY OF THE INVENTION

The present invention provides apparatus having increased sensitivity for spectroscopic gas analysis. The apparatus has radiation source means for generating two coherent beams of monochromatic radiation. Such radiation source means has a tuning means associated therewith for adjusting the frequency difference between said beams of radiation to equal substantially the rotational frequency of a preselected constituent of gaseous material. A projecting means is provided for directing the beams of radiation through the gaseous material to produce scattered radiation that contains a detectable signal composed of an anti-Stokes component generated coherently during scattering. A filtering means, adapted to receive the scattered radiation, selectively transmits the signal to a detecting means, which indicates the intensity thereof.

Further, the invention provides a method for spectroscopically analyzing gas comprising the steps of generating two coherent beams of monochromatic radiation; adjusting the frequency difference between the beams of radiation to equal substantially the rotational frequency of a preselected constituent of gaseous material; directing the beams of radiation through the gaseous material to produce scattered radiation that contains a detectable signal composed of an anti-Stokes component generated coherently during scattering; filtering the scattered radiation to selectively transmit the detectable signal; and indicating the intensity of the signal.

Several known tuning means may be adapted for use with the above apparatus. Preferably, the tuning means comprises a pair of high resolution diffraction gratings adjusted to transmit the two monochromatic light beams at a frequency differential correlated with the rotational frequency of a molecular species of the gaseous material. This condition is obtained when $$2\omega_1 - \omega_2 = \omega_3 \text{ and } \omega_1 - \omega_2 = \omega_3 - \omega_1 = \omega_R$$

where $\omega_1$ and $\omega_2$ represent, respectively, the frequencies of the two coherent beams of monochromatic radiation, $\omega_3$ is the frequency of the coherently generated anti-Stokes component and $\omega_R$ is the rotational frequency of the molecular species. For a given molecular species, the rotational spectra exist at a unique set of frequencies. Each of these spectra can be resonantly enhanced to produce an anit-Stokes rotational component of significantly increased intensity. Identification of the species having a particular set of rotational spectra is made positively when resonant enhancement is detected for anti-Stokes components corresponding to several rotational spectra of the species.

The frequency range for the rotational spectra of a given species is very small. Thus, the entire rotational spectrum can be rapidly scanned at low cost using electronic instrumentation and a single radiation source. Advantageously, the detected signal is derived from a rotational spectral component of the species, the intensity of which is considerably greater than that of the species vibrational spectra. Accordingly, the intensity of the detectable signal, and hence the accuracy of the apparatus, is far greater than that obtained by apparatus wherein the detectable signal comprises coherently generated vibrational Raman spectra of gaseous material.

BRIEF DESCRIPTION OF THE DRAWINGS

The invention will more fully understood and further advantages will become apparent when reference is made to the following detailed description of the preferred embodiments of the invention and the accompanying drawings in which:

FIG. 1 is a block diagram showing apparatus for spectroscopic gas analysis; and

FIG. 2 is a schematic diagram of the apparatus of FIG. 1.

DESCRIPTION OF THE PREFERRED EMBODIMENTS

Radiation carrying rotational spectra is found in each of the visible, infrared and ultraviolet frequency regions. As a consequence, the invention will function with radiation having a relatively wide range of frequencies. For illustrative purposes, the invention is described in connection with method and apparatus for measuring rotational spectra of gaseous material scattered by radiation from the visible frequency region. When applied in this manner, the invention is particularly suited to detect and to measure quantitatively minor constituents of a gaseous material such as air. It will be readily appreciated that the invention can be practiced using radiation from any of the foregoing frequency regions, and that it can be employed for similar and yet diversified uses, such as the analysis of vibration-rotation spectra, the determination of molecular gas constants and the like.

Referring to FIG. 1 of the drawings, there is shown preferred apparatus for spectroscopic gas analysis. The apparatus, shown generally at 10, has radiation source means 12 for generating two coherent beams 15, 17 of monochromatic radiation. The radiation source means 12 has associated therewith a tuning means 14 for adjusting the frequency difference between the beams of radiation to equal substantially the rotational frequency of a preselected constituent of gaseous material. A projecting means 16 is provided for directing the beams of radiation 15, 17 through gaseous material in compartment 18 to produce scattered radiation 20 that contains a detectable signal 22 composed of an anti-Stokes component generated coherently during scattering. A filtering means 23 is adapted to receive the scattered radiation from compartment 18. The filtering means selectively separates the signal 22 from the scattered radiation and transmits the signal 22 to a detecting means 24 which indicates the intensity thereof.

More specifically, as shown in FIG. 2, the radiation source means 12 can comprise a dye laser shown generally at 24 adapted to be excited by energy from flash lamp 26 or from a pulsed nitrogen laser, a frequency doubled, pulsed ruby laser or the like. Such dye laser 24 includes (1) a cell 28 containing dye material and (2) a laser cavity comprised of a partially transmitting output mirror 30 and a optical element 32 for generating laser radiation. The dye materials which are suitable for use in the dye laser 24 are any of those conventionally employed which, when excited, emit light having frequencies in the transparency range of the gaseous material being analyzed. Typical dye materials include Rhodamine 6G, Kiton Red, Cresyl Violet, Nile Blue and the like.

Radiation emitted from the dye material in dye cell 28 is continuously tunable over a wide frequency range. A tuning means 14 associated with the dye cavity 24 separates the radiation into a pair of coherent beams of monochromatic radiation $\omega_1$, $\omega_2$, which are transmitted from the radiation source means 12 via output mirror 30. Generation of the detectable signal 22 is most efficient when the radiation emitted from the dye laser 24 has a line width and frequency stability about equal to or less than the line width of the rotational spectra of the gas appointed for detection.

The use of a pulsed dye laser as the radiation source means 12 together with a time gated electronic detection system permits determination of pollutant concentration and location of a sample of gaseous material remote from the apparatus 10. For example, by providing the apparatus 10 with (1) means for measuring the time interval required to send a laser pulse into the sample and receive a return signal caused by light scattered therein and (2) means for measuring the amplitude of the return signal, the distance of the sample from the apparatus 10 as well as the pollutant concentration thereof is readily obtained. A pulsed laser adapted to determine pollutant concentration and location in the above manner preferably has means for generating radiation having a line width and frequency stability about equal to or less than the line width of the rotational spectra of the gas appointed for detection.

The tuning means can include a varying number of optical components assembled in a variety of combinations. In one embodiment of the apparatus 10, the tuning means 14 comprises a beam splitting means 34 for separating radiation from dye cell 28 into a pair of radiation beams, $\omega_1$, $\omega_2$ and a pair of diffraction gratings 36, 38 mounted in autocollimation. The two diffraction gratings 36, 38 function in the manner of a conventional back mirror and, in addition, restrict the frequency range of the radiation beams so as to produce within cavity 24 a pair of coherent beams of monochromatic radiation having narrow line widths. A beam expanding telescope 29 can, optionally, be disposed in series with and between dye cell 28 and beam splitting means 34 for enlarging the width of the beams and improving the efficiency of the gratings. The tuning means 14 can additionally comprise a pair of etalons 40, 42, disposed in series with and between the beam splitting means 34 and diffraction gratings 36, 38, for further restricting the frequency of the radiation beams. Diffraction gratings 36, 38 are connected through shaft encoded stepping motors 44, 46 to a control means 48 adapted to vary the rotational velocity of stepping motor 44 relative to the rotational velocity of stepping motor 46. Radiation beams $\omega_1$, $\omega_2$ are tuned by rotating the diffraction gratings 36, 38 corresponding thereto so that the frequency difference therebetween equals substantially the rotational frequency of a preselected constituent of gaseous material.

The control means 48 is preferably adjusted so that the frequency scanning rate of diffraction grating 36 is twice that of diffraction grating 38. This adjustment of the control means 48 permits generation of a detectable signal 22 having a substantially constant frequency. A single narrow band pass filter 56 can thus be used to reject unwanted radiation produced during scattering and selectively transmit the detectable signal 22.

A projecting means comprising mirror 50 is associated with the dye laser 24. The projecting means introduces the two coherent beams of monochromatic radiation 15, 17 into gaseous material in sample compartment 52 in one direction, which will be considered to be substantially vertical for convenience in referencing directions but may, of course, be in any direction desired. Raman scattered radiation 20 from the gaseous material in sample compartment 52 is transmitted via mirror 54 to the filtering means 23.

Several known filtering means may be used with the apparatus 10. Preferably, the filtering means 23 is a narrow band pass interference filter 56 adapted to receive the scattered light 20 from sample 52. In addition, the filtering means includes a lens 60 and a pinhole stop 58 which cooperate to effect separation of the detectable signal 22 from the scattered radiation 20. The latter includes radiation beams 15 and 17, together with an anti-Stokes beam which is generated coherently during scattering. Interference filter 56 is constructed to transmit radiation within a narrow frequency range centered at the frequency of the anti-Stokes signal 22.

Before describing how the apparatus of FIG. 2 can be used to determine the intensity of signal 22, it would be helpful to explain the principles underlying generation of coherent rotational anti-Stokes spectra.

When two light beams at $\omega_1$ and $\omega_2$ are incident on a non-linear material, coherent emission at $2\omega_1 - \omega_2$ is generated through the third-order nonlinear polarization. The third-order nonlinear susceptibility $\chi^{(3)}$ associated with this polarization is responsible for the emission. $\chi^{(3)}$ is composed of two basic parts, $\chi^{(3)} nr$ a non-resonant part that gives rise to constant background signal and a resonant part $\chi^{(3)} r$ that contains resonant denominators that show large enhancement at $2\omega_1 - \omega_2$ when $\omega_1 - \omega_2 \rightarrow \omega_r$ and when $\omega_1$ of $\omega_2$ approach an electronic resonance in the material (similar to the resonance Raman effect). At the peak of the Raman resonance, $\chi^{(3)}r$, which is normally a sum of real and complex parts, reduces to the complex component that is related to the differential Raman cross section by the following equation $$\chi''R = \frac{\pi c^4}{\hbar \omega_1 \omega_2^3 \Gamma_R}\left(\frac{d\sigma}{d\Omega}\right)$$

where $\Gamma_R$ is the normal Raman line width ($hwhm$) and $d\sigma/d\Omega$ is the usual spontaneous Raman differential cross section. Since $d\sigma/d\Omega$ is a factor of between 1 and 10 larger, and $\Gamma_R$ a factor of between 1 and 10 smaller for rotational lines, this susceptibility $\chi''_R$ is between 1 and 100 times larger for rotational lines over vibrational lines.

The conversion efficiency to the anti-Stokes is given by the equation:

$$\epsilon = \frac{P(\omega_3)}{P(\omega_2)} \propto \frac{\omega_3^2}{n^4}|N\chi^{(3)}|^2 l\, coh^2 \left(\frac{P(\omega_1)}{A}\right)^2$$

where $n$ is the refractive index; N is the molecular number density; $l_{coh}$ is the coherence length or the distance over which collinear beams slip out of phase by $\pi$ radians; and A is the cross-sectional beam area. Since the nonlinear susceptibility $\chi^{(3)}$ is squared in this efficiency expression, a greater efficiency for rotational scattering over vibrational scattering of between 1–10,000 times that for vibrational lines is obtained.

The detectable signal 22 from interference filter 56 is focused in the plane of pinhole stop 58 by a lens 60. Lens 60 is adjusted so that the center of the signal 22 is positioned on the pinhole 62. The intensity of the portion of signal 22 passing through the pinhole 62 is detected by a photomultiplier 64. The output of the filtering means 23, representing signal 22, is displayed by an indicating and recording means 66, which can comprise an oscilloscope and a chart recorder.

The apparatus 10 which has been described herein can, of course, be modified in numerous ways without departing from the scope of the invention. For example, the filtering means 23 can comprise the combination of fixed etalon tuned by controlling the temperature thereof and a narrow band pass interference filter having its pass band centered at the frequency of the anti-Stokes signal 22. One type of fixed etalon which is suitable is comprised of optically transparent material, such as fused silica, having opposed surfaces which are polished, flat, parallel and coated with silver, dielectric material or the like for high reflectivity at a preselected frequency region. The thickness of the etalon used in the filtering means 23 can be chosen so that the spectral range of the etalon is equal to or greater than the full width of half transmission points of the narrow band pass interference filter. Fine tuning of the solid etalon used in the filtering means is affected by providing means for controlling the temperature, and hence the optical path length, thereof so as to cause the transmission peak for an order to be centered at the frequency of the anti-Stokes component of signal 22. Such solid etalon preferably has a finesse chosen so that the full width at half transmission points thereof is substantially equal to the spectral width of the anti-Stokes signal 22. The tuning means can be comprised of a single diffraction grating adapted to generate first and second beams $\omega_1$, $\omega_2$ of monochromatic radiation, the second beam $\omega_1$ being derived from the second order of the grating and having its frequency tuned at twice the rate of the first beam. An acousto-optic modulator 39 can be disposed in series with and between telescope 29 and diffraction grating 38 to effect electronic generation of the radiation beams $\omega_1$, $\omega_2$.

A calibrating means shown generally at 68 including beam splitting means 70, reference gas cell 72 and detecting and recording means 74 can, optionally, be associated with the apparatus 10 for providing a reference anti-Stokes signal 76 derived from a reference gas of the type being analyzed. The beam splitting means 70 is adapted to direct a portion of radiation beams 15, 17 through the reference gas, which is contained in cell 72. Scattered radiation produced in reference gas cell 72 is processed by detecting means 74, which is constructed and operated in the same manner as detecting means 24. The output of the detecting means 74 represents the magnitude of the reference anti-Stokes signal 76 for a known concentration of reference gas. Such output signal can be compared with the output signal of detecting means 24 to determine the concentration of gas in sample compartment 52. The increased sensitivity of the apparatus 10 makes it especially suited for detection at distant locations of gaseous constituents present in the low parts per million range. Hence, the gaseous material need not be located within a sample compartment, but may instead be located at points distant from the apparatus 10, as in the order of up to about 20 miles distant therefrom. Other similar modifications can be made which fall within the scope of the present invention. It is, accordingly, intended that all matter contained in the above description and shown in the accompanying drawings be interpreted as illustrative and not in a limiting sense.

In operation of the preferred apparatus, radiation source means 12 generates two coherent beams 15, 17 of monochromatic radiation. The frequency difference between the radiation beams 15, 17 is adjusted by tuning means 14 to equal substantially the rotational frequency of a preselected constituent of gaseous material. Projecting means 16 directs the radiation beams 15, 17 through the gaseous material to produce scattered radiation 20 containing a detectable signal 22 composed of an anti-Stokes component generated coherently during scattering. A filtering means 23 receives the scattered radiation 20 and selectively separates the signal 22 therefrom. The resultant signal 22 from the filtering means 23 is displayed by the indicating and recording means 66.

Having thus described the invention in rather full detail, it will be understood that these details need not be strictly adhered to but that various changes and modifications may suggest themselves to one skilled in the art, all falling within the scope of the present invention as defined by the subjoined claims.

We claim:
1. Apparatus for analyzing light, comprising:
   a. radiation source means for generating two coherent beams of monochromatic light;
   b. tuning means for adjusting the frequency difference between said beams of radiation to equal substantially the rotational frequency of a preselected constituent of gaseous material;
   c. projecting means for directing said beams of light through said gaseous material to produce scattered radiation containing a detectable signal composed of an anti-Stokes component generated coherently during scattering;
d. filtering means adapted to receive said scattered light and selectively transmit said signal;
e. detecting means for indicating the intensity of said signal.

2. Apparatus as recited in claim 1, wherein said radiation source means comprises a dye laser including a dye cell containing a dye material, means for exciting said dye and a laser cavity comprised of an optical element and a partially transmitting output mirror for generating and transmitting laser radiation.

3. Apparatus as recited in claim 2, wherein said dye material emits radiation upon being excited, said radiation having frequencies within the transparency range of said gaseous material.

4. Apparatus as recited in claim 1, wherein said tuning means comprises beam splitting means for separating said radiation into a pair of radiation beams, and a pair of diffraction gratings mounted in autocollimation.

5. Apparatus as recited in claim 4, wherein said tuning means further comprises a pair of etalons disposed in series with and between said beam splitting means and said diffraction gratings.

6. Apparatus as recited in claim 5, wherein said diffraction gratings are connected through shaft encoded stepping motors to a control means for varying the rotational velocity of one of said stepping motors relative to the rotational velocity of the other stepping motor.

7. Apparatus as recited in claim 6, wherein said control means is adjusted so that one of the gratings has a frequency scanning rate twice that of the other of said gratings.

8. Apparatus as recited in claim 1, wherein said tuning means comprises an acousto-optic modulator disposed in series with and between said dye cell and a diffraction grating, for effecting electronic generation of said radiation beams.

9. Apparatus as recited in claim 1, wherein said filtering means is a narrow band pass interference filter having its pass band centered at the frequency of said detectable signal.

10. Apparatus as recited in claim 1, wherein said radiation source means is associated with a time gated electronic detection system having (1) means for measuring the time interval required to send a pulse from said laser into a sample of said gaseous material and receive a return signal caused by radiation scattered therein and (2) means for measuring the amplitude of said return signal.

11. A method for spectroscopically analyzing gas comprising the steps of:
a. generating two coherent beams of monochromatic radiation;
b. adjusting the frequency difference between the beams of radiation to equal substantially the rotational frequency of a preselected constituent of gaseous material;
c. directing the beams of radiation through the gaseous material to produce scattered radiation that contains a detectable signal composed of an anti-Stokes component generated coherenyly during scattering;
d. filtering the scattered radiation to selectively transmit the detectable signal; and
e. indicating the intensity of the signal.

* * * * *